US008998245B1

(12) United States Patent
Anooshian et al.

(10) Patent No.: US 8,998,245 B1

(45) Date of Patent: Apr. 7, 2015

(54) FOLDING WHEELCHAIR

(71) Applicant: Sunrise Medical (US) LLC, Fresno, CA (US)

(72) Inventors: Benjamin Adrian Anooshian, Fresno, CA (US); Steven Julian Alatorre, Fowler, CA (US); Joseph Nobert Ram, Fresno, CA (US)

(73) Assignee: Sunrise Medical (US) LLC, Fresno, CA (US)

( * ) Notice: Subject to any disclaimer, the term of this patent is extended or adjusted under 35 U.S.C. 154(b) by 0 days.

(21) Appl. No.: 14/458,747

(22) Filed: Aug. 13, 2014

(51) Int. Cl.
*B62B 3/00* (2006.01)
*A61G 5/08* (2006.01)

(52) U.S. Cl.
CPC .......... *A61G 5/08* (2013.01); *A61G 2005/0825* (2013.01); *A61G 2005/0883* (2013.01); *A61G 2005/0891* (2013.01)

(58) Field of Classification Search
USPC ................. 280/33.993, 47.38, 639, 642–643, 280/644–648, 649–650, 659; 297/218.1, 297/218.2, 218.3, 219.12, 440.11
See application file for complete search history.

(56) References Cited

U.S. PATENT DOCUMENTS 4,676,519 A 6/1987 Meier
4,682,783 A 7/1987 Kuschall
4,861,056 A 8/1989 Duffy, Jr. et al.
5,154,438 A 10/1992 Barclay
5,188,383 A 2/1993 Thompson
5,253,886 A 10/1993 Weege
5,328,183 A 7/1994 Counts
5,496,050 A 3/1996 Geiger et al.
5,857,688 A 1/1999 Swearingen
6,135,475 A 10/2000 Brown et al.
6,241,275 B1 6/2001 Slagerman
6,422,556 B1 * 7/2002 Gibson ........................ 271/256
6,572,133 B1 6/2003 Stevens
6,616,172 B1 9/2003 Cockram
6,830,254 B2 * 12/2004 Lan ............................. 280/47.4
6,938,911 B1 9/2005 Shyu et al.
7,246,821 B2 7/2007 Sato
7,384,058 B2 6/2008 Munsey et al.
7,699,131 B2 4/2010 Wu
7,938,434 B2 5/2011 Smith
7,988,171 B2 8/2011 Chong
2004/0021299 A1 2/2004 Tsai
2006/0087103 A1 4/2006 Schreiber et al.
2006/0145456 A1 7/2006 Munsey, Sr. et al.
2007/0145723 A1 6/2007 Kamara (Continued)

OTHER PUBLICATIONS

Invacare, "Spyder", Owner's Operator and Maintenance Manual, Invacare Corporation, Elyria, US, 2000, pp. 1-32.

(Continued)

*Primary Examiner* — John Walters
*Assistant Examiner* — James Triggs
(74) *Attorney, Agent, or Firm* — MacMillan, Sobanski & Todd, LLC

(57) ABSTRACT

A wheelchair includes left and right side frames and a folding mechanism for connecting the left and right side frames to each other in a folding and unfolding relationship. The folding mechanism includes cross struts rotatably connected to the lower side frame members, hinge links connected to the upper side frame members, and a lock for locking the hinge links together when the folding mechanism is unfolded to form a rigid truss between the left and right upper side frame members.

20 Claims, 13 Drawing Sheets

(56) References Cited

U.S. PATENT DOCUMENTS

| | | | |
|---|---|---|---|
| 2008/0238041 | A1 | 10/2008 | Chen |
| 2008/0265542 | A1 | 10/2008 | Chong |
| 2010/0194077 | A1 | 8/2010 | Wagner et al. |

OTHER PUBLICATIONS

Invacare, "Spyder", Wheelchair Specifications, Invacare Corporation, Elyria, US, 2002, pp. 1-4.

* cited by examiner

PRIOR ART

FOLDING WHEELCHAIR

RELATED APPLICATIONS

None

TECHNICAL FIELD

This invention relates in general to folding wheelchairs. In particular, this invention relates to a folding wheelchair having a support structure for connecting wheelchair side frame members.

BACKGROUND OF THE INVENTION

Wheelchairs are a class of personal mobility vehicle that provide greater ambulatory freedom to persons having limited movement abilities. Wheelchairs may be constructed having rigid frames to provide a solid or sturdy feeling to a user. Alternatively, wheelchairs may be foldable to provide greater portability. Folding wheelchairs often have frame support elements that secure mating frame components together. An improved and more adaptable connection between wheelchair side frame members in folding wheelchairs would be desirable.

SUMMARY OF THE INVENTION

According to this invention there is provided a folding mechanism for a wheelchair. The wheelchair includes left and right side frames, each side frame having a lower side frame member and an upper side frame member. The folding mechanism connects the left and right side frames to each other in a folding and unfolding relationship. The folding mechanism includes cross struts, hinge links, and a lock. The cross struts are rotatably connected to the lower side frame members, and the cross struts include one or more cross struts from the left side frame pivotally connected to one or more cross struts from the right side frame. The hinge links are connected to the upper side frame members, the hinge links having a first end pivotally connected to the upper side frame member and a distal end, wherein pivoting of the hinge links relative to the upper side frame members causes the left and right side frames to move closer together in a folding movement or farther apart in an unfolding movement. The lock is for locking the hinge links together when the folding mechanism is unfolded, to form a rigid truss between the left and right upper side frame members, thereby fixing the distance between the left and right upper side members at a widest point of rotation established by the hinge links.

In one embodiment, the lock includes a locking lever, and further includes a tension link mounted to the locking lever and at least one of the hinge links so that force on the tension link pivots the hinge links relative to the upper side frame members, thereby rotating the cross struts and causing the left and right side frame members to move closer together to fold the wheelchair.

In another embodiment, the lock has a pivotally mounted handle, the handle being mounted so that pivoting the handle to a locked position places the handle in a toggle over center condition.

In yet another embodiment, the hinge links are connected to the upper side frame members in the absence of seat rails.

In another embodiment, the wheelchair includes a seat pan or a seat sling supported by the left and right upper side members. Optionally, the truss between the left and right upper side frame members is sufficiently rigid to enable the wheelchair to accommodate interchangeably both a rigid seat pan and a sling seat.

In yet another embodiment, the wheelchair includes a pivotally mounted handle, the handle being mounted so that lifting the handle in an upward direction both unlocks the left and right hinge links from each other, and pivots the hinge links relative to the side frames to fold the folding mechanism, with the handle enabling vertical folding of the wheelchair with one hand by grasping and lifting the handle.

According to this invention there is also provided a wheelchair including left and right side frames, each side frame having a lower side frame member and an upper side frame member. The wheelchair also includes a folding mechanism for connecting the left and right side frames to each other in a folding and unfolding relationship. The folding mechanism includes cross struts, hinge links, and a lock. The cross struts are rotatably connected to the lower side frame members. One or more of the cross struts from the left side frame are pivotally connected to one or more cross struts from the right side frame. The hinge links are connected to the upper side frame members. The hinge links have a first end pivotally connected to the upper side frame member and a distal end, with the hinge links being pivotally connected at their intermediate portions to the cross struts. Relative rotation of the cross struts with respect to each other causes pivoting of the hinge links relative to the upper side frame members, and causes the left and right side frames to move closer together in a folding movement or farther apart in an unfolding movement. The lock locks the hinge links together when the folding mechanism is unfolded to form a truss between the left and right upper side frame members, thereby fixing the distance between the left and right upper side members, the lock having a pivotally mounted handle, the handle being mounted so that pivoting the handle to a locked position places the handle in a toggle over center condition.

Various advantages of this invention will become apparent to those skilled in the art from the following detailed description of the preferred embodiment, when read in light of the accompanying drawings.

DETAILED DESCRIPTION OF THE INVENTION

In general, mating frame components of a folding wheelchair, for example vertical and horizontal side frame members, may be secured together by welding or locking frame support elements that fix the frame members together. Alternatively, the frame support elements may be open structures without locking means, such as "U"-shaped structures, that allow, for example, tubular frame elements to be supported relative to each other.

The overall wheelchair stiffness, particularly the connection among various frame members, for example side frame members, has a direct impact on the ride characteristic. This is particularly true when the folding mechanism is articulated into an unfolded or open position. When operating a folding wheelchair, some users may prefer a more rigid ride characteristic, whereas other users require a more flexible ride characteristic.

Folding wheelchairs typically are provided with one of two different seating configurations. Some wheelchairs are configured to support the user with a saddle seat having a flexible seat sling stretched between the left and right side frames. A seat cushion is typically placed on the sling for the comfort of the user. Other folding wheelchairs are configured to support a rigid seat pan upon which a flexible seat cushion can be placed. It would be advantageous if folding wheelchairs of a single design could be provided to accept both rigid seat pan mounting plates and flexible saddle seats.

Typical vertically folding wheelchairs use an overcenter toggle relationship to lock the vertical or diagonally oriented cross struts into place when the wheelchair is in the completely open or unfolded position. The overcenter toggle relationship locks the cross struts by pivoting them relative to each other beyond a biasing point so that a spring force is required to reverse the pivoting of the cross struts in order to fold the chair. The resulting configuration applies a lateral biasing force against each of the upper side frame members of the wheelchair. This lateral biasing force typically applies a force pushing the upper side frame members away from each other. Everyday use of the wheelchair causes some activation or movement of the user up and down vertically relative to the wheelchair seat and frame, and this affects the forces applied by the overcenter toggle mechanism. The result of these variable forces on the overcenter toggle relationship of the cross struts is that the spacing or width between the left and right wheelchair upper side frame members actually varies during use of the wheelchair. As a consequence, the wheelchair user experiences a loose or somewhat unstable wheelchair foundation for the seat cushion, which is an undesirable feature for a wheelchair. Accordingly, improvements in this area would be beneficial.

Figure 1:
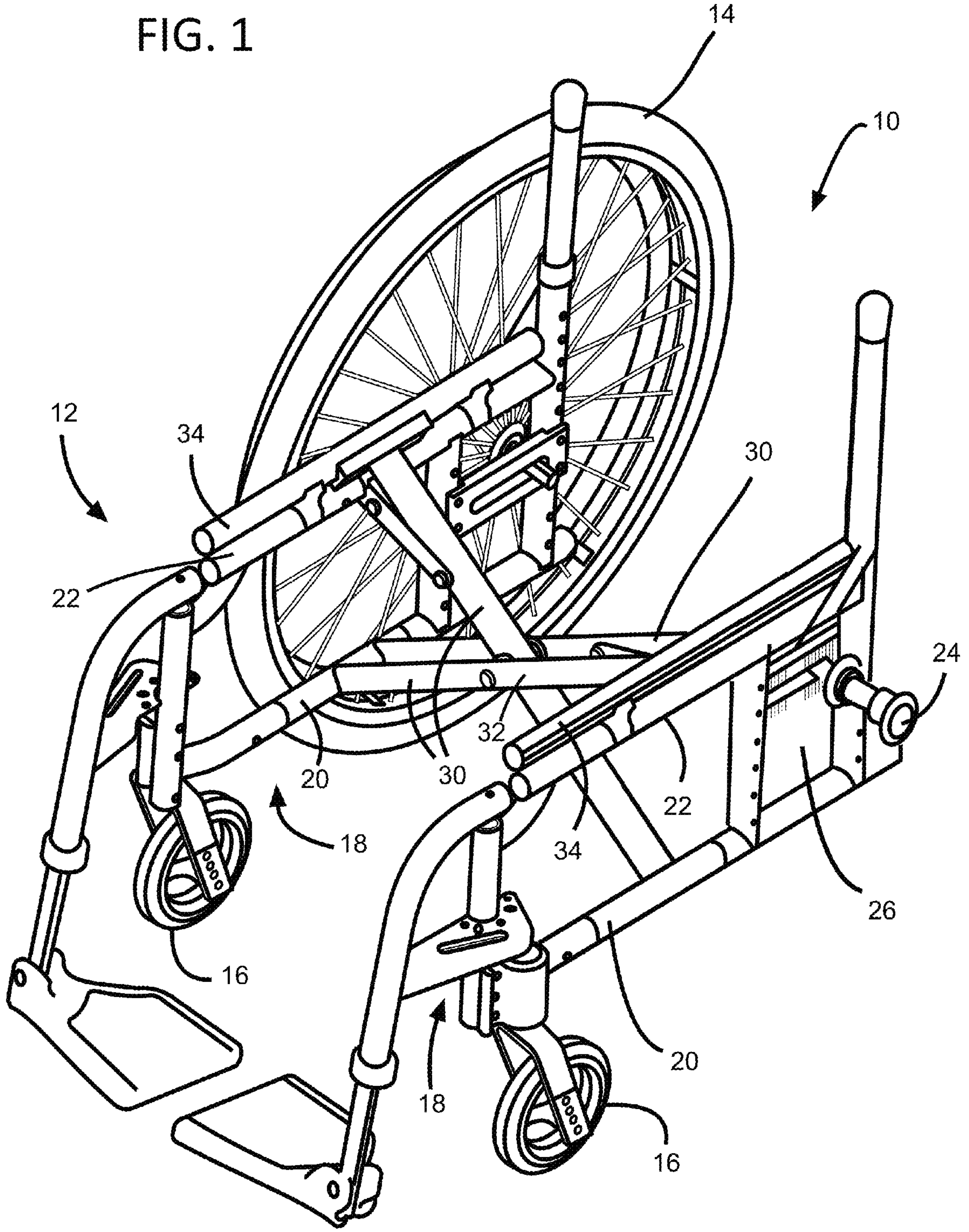
FIG. 1 is a schematic view in perspective of a conventional wheelchair.

Referring now to the drawings, there is illustrated in FIG. 1 a folding conventional wheelchair 10 that includes a frame 12, a pair of spaced apart drive wheels 14 (only one of which is shown for clarity), and a pair of pivotable caster wheels 16. The drive wheels 14 are shown as manual drive wheels. The frame 12 is a folding frame that includes left and right side frames, shown generally at 18. Each side frame 18 includes a lower side frame member 20 and an upper side frame member 22. The side frame 18 may also include an axle mount 24, shown as an axle plate 26 that is height adjustable and wheelbase adjustable between the lower and upper side frame members 20 and 22.

The folding mechanism includes cross struts 30, each of which is rotatably connected at its lower end to a lower side frame member 20. The cross struts 30 from the left side frame 18 are pivotally connected to the cross struts from the right side frame 18 at a central pivot location 32 to allow folding and unfolding of the wheelchair. The cross struts 30 are connected at their upper ends to seat rails 34.

Figure 2:
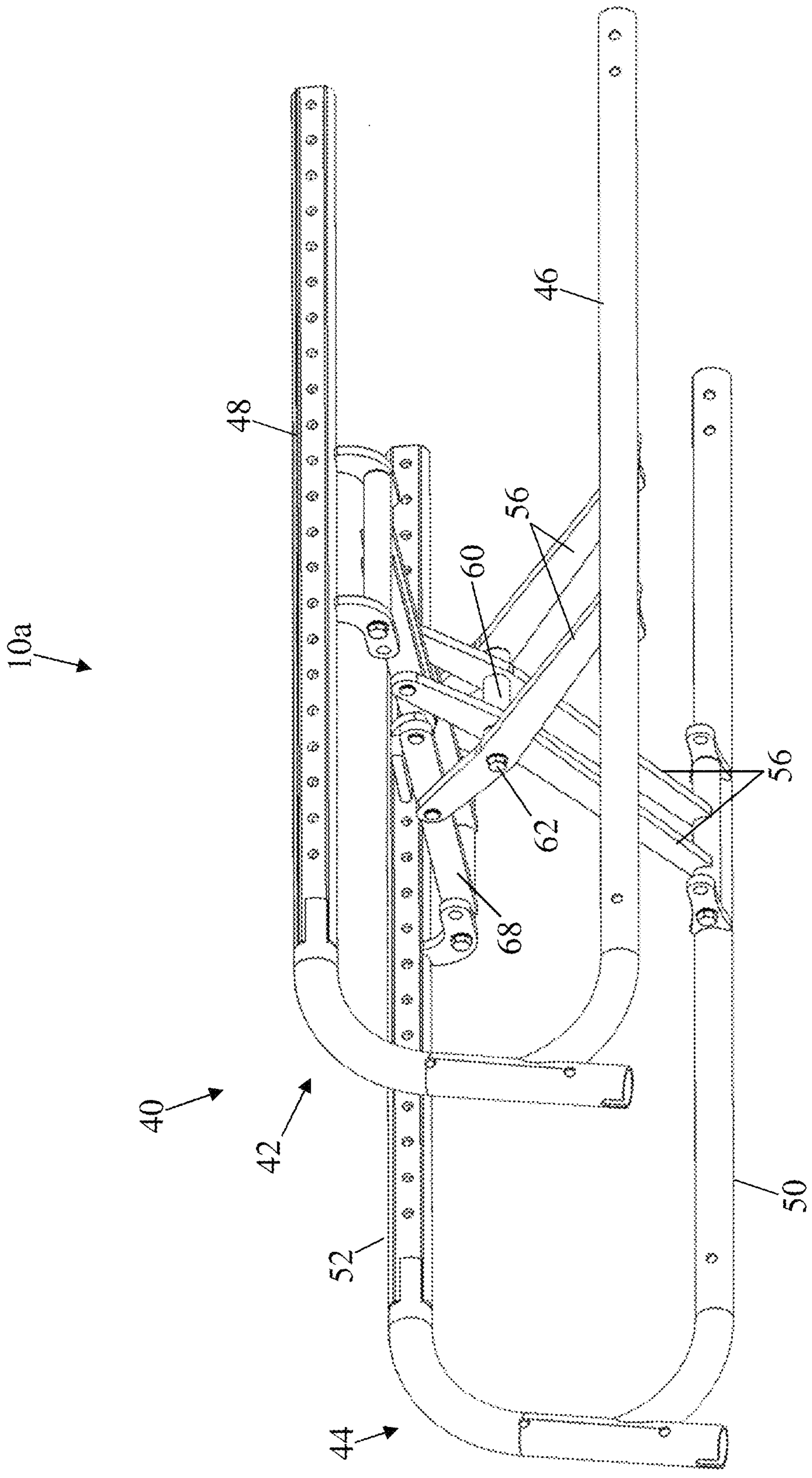
FIG. 2 is a schematic perspective view of a wheelchair and wheelchair frame and folding mechanism of the invention.

Referring now to FIG. 2, the wheelchair **10*a* and wheelchair folding mechanism 40 of the invention include left and right side frames 42 and 44, respectively. For clarity, the wheels are not shown. The left side frame 42 includes a lower side frame member 46 and an upper side frame member 48. The right side frame 44 includes a lower side frame member 50 and an upper side frame member 52**.

The wheelchair **10*a* further includes spaced apart drive wheels, pivotally mounted caster wheels, and an axle mount 24, all of which are not shown for clarity. The axle mount can be of any suitable form, such as an axle plate that is height adjustable and wheelbase adjustable between the lower and upper side frame members 46, 48, 50 and 52**, respectively.

The folding mechanism 40 also includes cross struts 56, each of which is rotatably connected at its lower end to a lower side frame member 46, 50. The cross struts 56 from the left lower side frame member 46 are pivotally connected to the cross struts from the right lower side frame member 50 at a central pivot structure 60 to allow folding and unfolding of the wheelchair. The central pivot structure 60 can be any suitable structure for allowing the cross struts 56 from one side of the wheelchair to pivot with respect to the cross struts 56 from the other side. The central pivot structure 60 can comprise a bolt 62 inserted into holes in the cross struts 56 with spacers and a nut to accommodate the pivoting action of the cross struts 56. The cross struts 56 are rotatably mounted to the lower side frames 46, 50.

Figure 3:
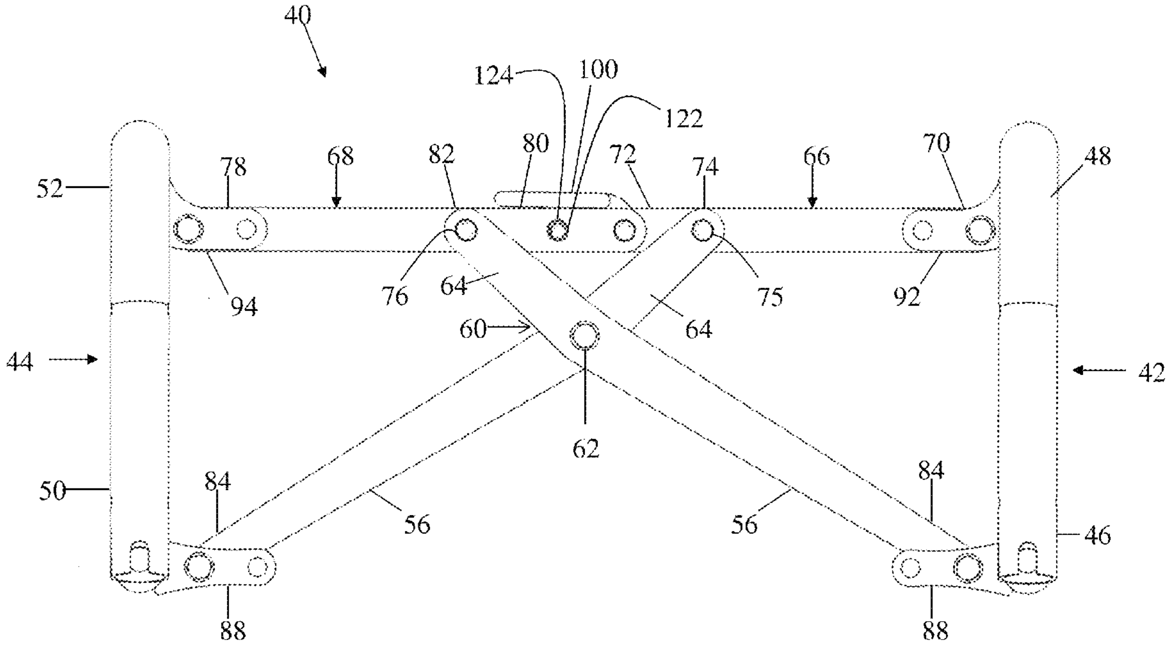
FIG. 3 is a schematic front elevational view of the folding mechanism of the wheelchair frame of FIG. 2, with the folding mechanism in the unfolded condition.
Figure 4:
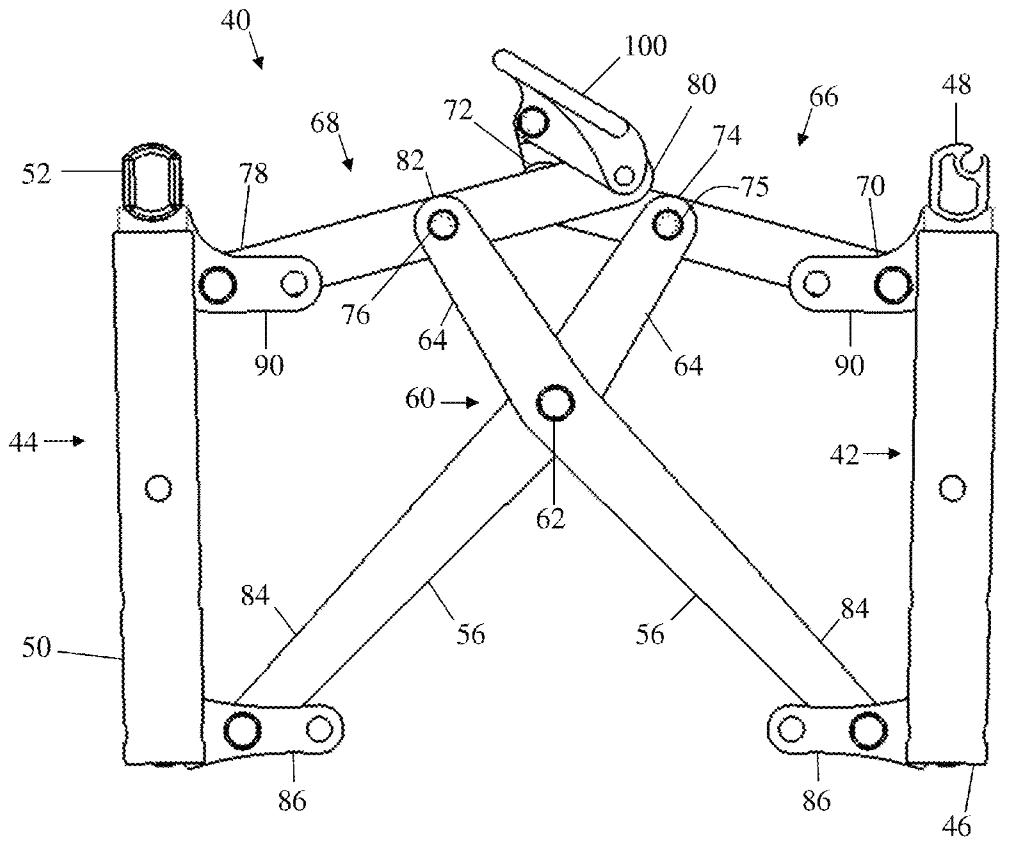
FIG. 4 is a view similar to FIG. 3, with the folding mechanism in a partially folded condition.
Figure 5:
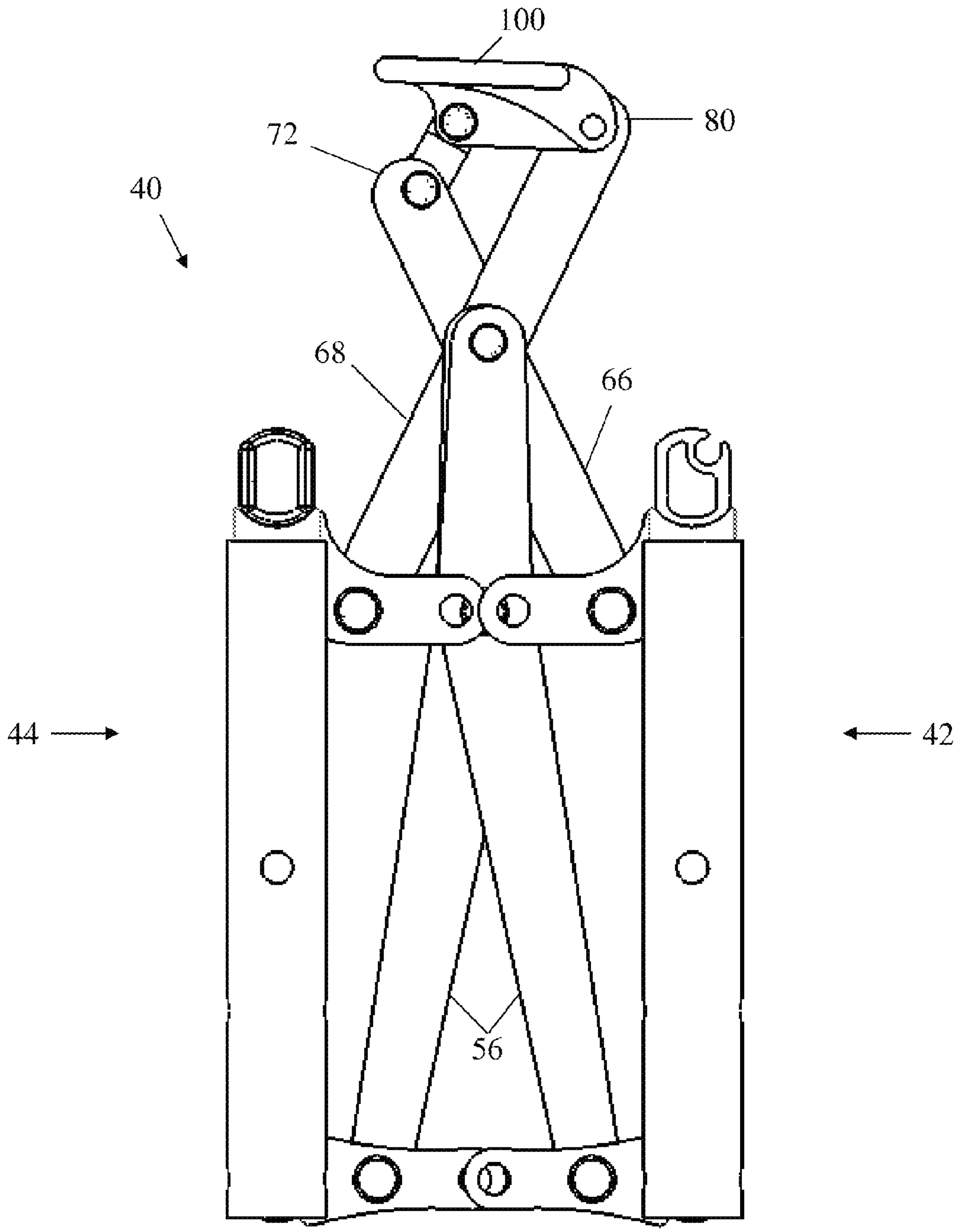
FIG. 5 is a view similar to FIG. 3, with the folding mechanism in a folded condition.

As shown in FIGS. 3-5, the cross struts 56 have upper ends 64 extending upwardly beyond the central pivoting structure 60. The folding frame 40 also includes hinge links 66, 68 that are pivotally connected to the upper side frame members 48, 52, respectively. Each of the upper side frame members 48, 52 has one or more of the hinge links 66, 68 connected to it. The left hinge link 66 has a first end 70 pivotally connected to the upper side frame member 48, a distal end 72, and an intermediate portion 74. The right hinge link 66 has a first end 78 pivotally connected to the upper side frame member 52, a distal end 80, and an intermediate portion 82.

Hinge link 66 is pivotally connected at its intermediate portion 74 via pivot point 75 to the upper end 64 of a cross strut 56, and hinge link 68 is pivotally connected at its intermediate portion 82 via pivot point 76 to the upper end 64 of a different cross link 56. Relative rotation of the cross struts 56 with respect to each other about the central pivoting structure 60 causes pivoting of the hinge links 66, 68 relative to the upper side frame members 48, 50, and causes the left and right side frames 18 to move closer together in a folding movement, or to move farther apart in an unfolding movement. It can be seen that the wheelchair **10*a* has no seat rails, and the upper ends 64 of the cross struts are connected to the hinge links 66, 68**.

Figure 6:
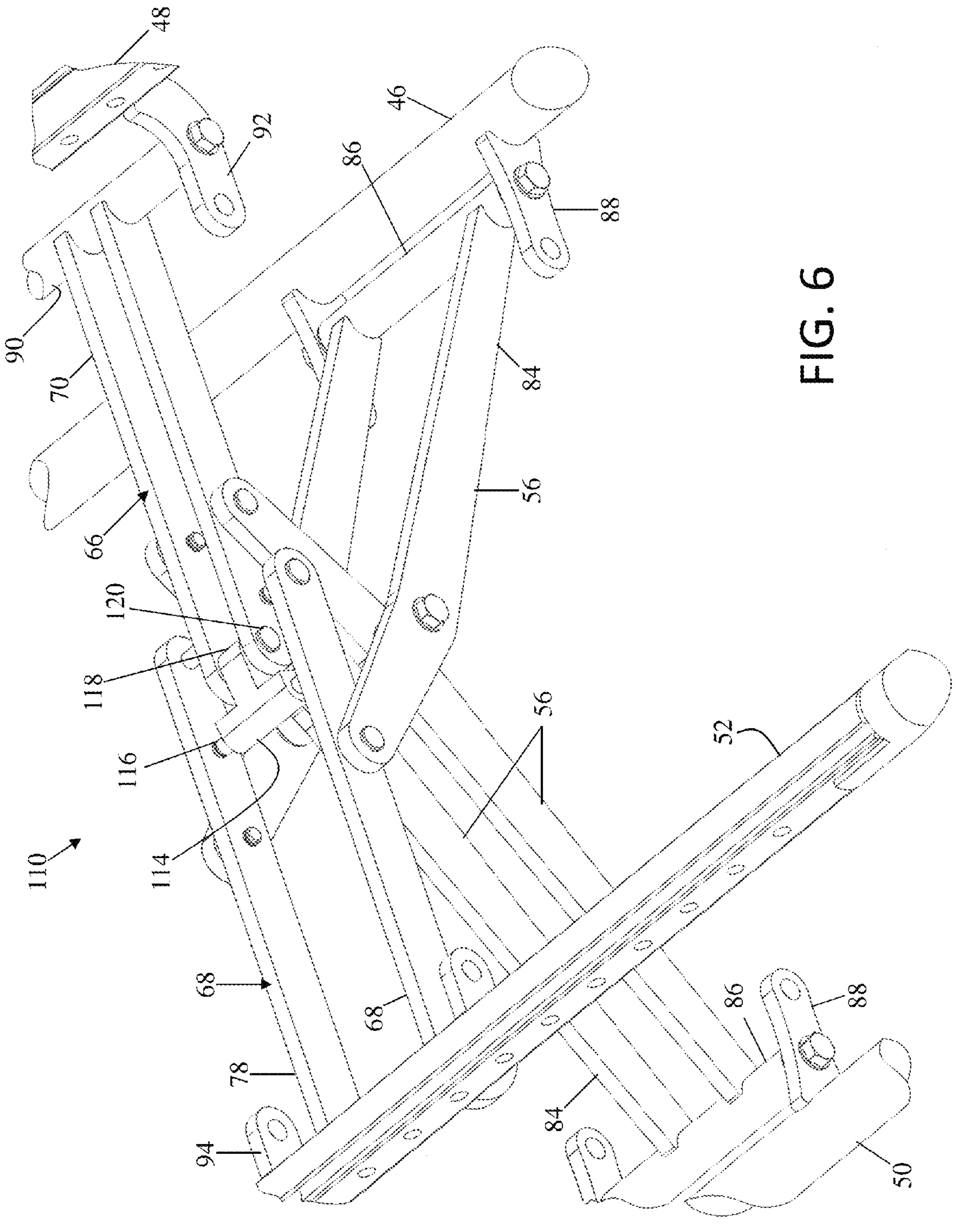
FIG. 6 is a schematic view in perspective of the folding mechanism in a completely unfolded condition.

Optionally, as shown in FIG. 6, the cross struts 56 are pivotally mounted at their lower ends 84 by means of pivot bars 86 which are pivotally connected to the lower side frame members 46, 50 by means of tabs 88. The tabs 88 can have multiple mounting points, as shown, to enable the wheelchair to be configured in different widths. Similar pivot bars 90 and mounting tabs 92 and 94 are optionally provided at the upper side frame members 48, 52, respectively, for mounting the first ends 70, 78 of the hinge links 66, 68, respectively. Other attachment mechanisms could be used.

Figure 7:
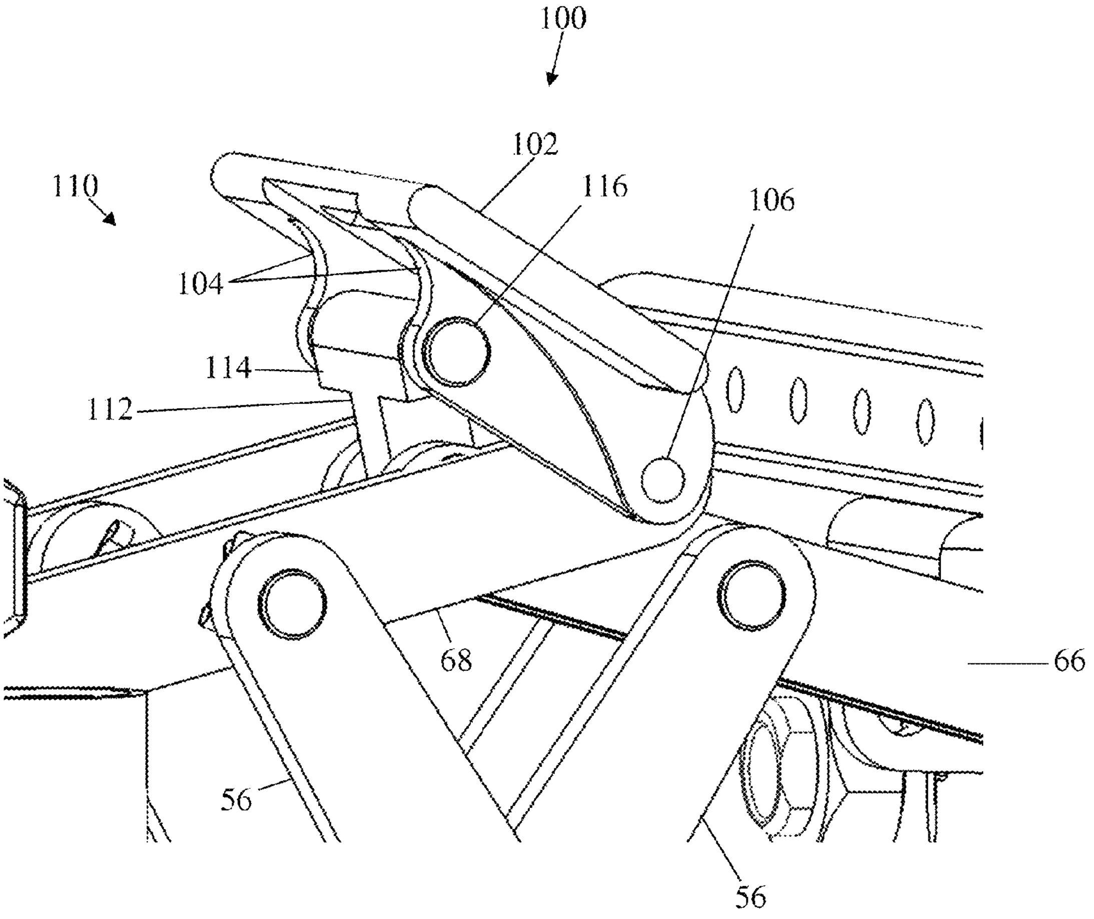
FIG. 7 is a schematic view in perspective of the upper portion of the partially folded folding mechanism of FIG. 3.

As shown in FIG. 3, when the folding mechanism 40 is in the completely unfolded position, the hinge links 66, 68 are substantially parallel. A locking lever 100 can be used to lock the hinge links 66, 68 in place. As shown in FIG. 7, the locking lever 100 includes a cap or handle 102, a pair of structural walls 104, and a pivot mechanism 106 at a handle pivot end to allow the locking lever 100 to be pivotally mounted on the hinge link 68. The distal end of the locking lever 100 includes a tension link 110 for locking down the locking lever 100 in an overcenter toggle relationship. As shown in FIGS. 6 and 7, the tension link 110 includes a web 112, a first pivot end 114 pivotally connected to the locking lever 100 via pivot pin 116, and a second pivot end 118 connected to hinge link 66 by pivot 120. For clarity, the locking lever 100 is not shown in FIG. 6.

The relative positioning of the tension link 110 and the locking lever 100 is set so that when the locking lever 100 is snapped down as shown in FIG. 3, the tension link 110 and locking lever 100 are in an overcenter toggle relationship. This provides resistance to unlatching of the locking lever 100, thereby biasing the locking lever 100 into a latched condition. Therefore, when the locking lever 100 is in the latched position, the hinge links 66, 68 are stabilized with respect to each other in a substantially horizontal position. It can be seen that this mechanism for stabilizing the hinge links 66, 68 together in a substantially horizontal position does not apply a significant inward or outward force against the side frames 42, 44. Furthermore, the locking of the hinge links forms a rigid truss 126 between the left and right upper side frame members 48, 52. Also, although the locking lever 100 holds the hinge links 66, 68 in place using an overcenter toggle arrangement, the cross struts 56 themselves are not in an overcenter toggle relationship. The effect of this structure is that as the wheelchair user is lifted or lightly bounced up and down during normal operation of wheelchair, the locked hinge links 66, 68 will not be substantially moved relative to each other. This is in contrast to a conventional folding wheelchair 10 where the up and down movement of the wheelchair user during normal operation causes the cross struts to rotate slightly relative to each other, thereby changing the width between side rails and giving a feeling of instability to the wheelchair. It can be seen that the locking lever 100 locks the hinge links 66, 68 together when the folding mechanism 40 is unfolded, to form a rigid link between the left and right upper side frame members 48, 52, thereby fixing the distance between the left and right upper side members 48, 52.

The locking mechanism makes the folding wheelchair frame more rigid than would be the case where the cross braces 56 are held together in a overcenter toggle arrangement. The distance between the upper side frame is fixed. A seat rail is not necessary. The hinge mechanism can be unlatched without loosening the saddle. There is no requirement that the seat rails be stretched apart by an overcenter toggle structure to keep the sling in tension. The locking mechanism locks the hinge links 66, 68 into a solid horizontal member or rigid truss. Further, the hinge links do not extend across the entire width or span between the left and right upper side frame members 48, 52. Instead, they extend only part of the way across.

In one embodiment, the locking mechanism can be merely a pin 122 inserted into a receiving orifice 124 that extends through the distal ends 72, 80 of the hinge links 66, 68, respectively, as shown in FIG. 3.

In another embodiment, the locking mechanism is a snap fit structure so that the locking lever snaps and is held in place when locked.

Figure 8:
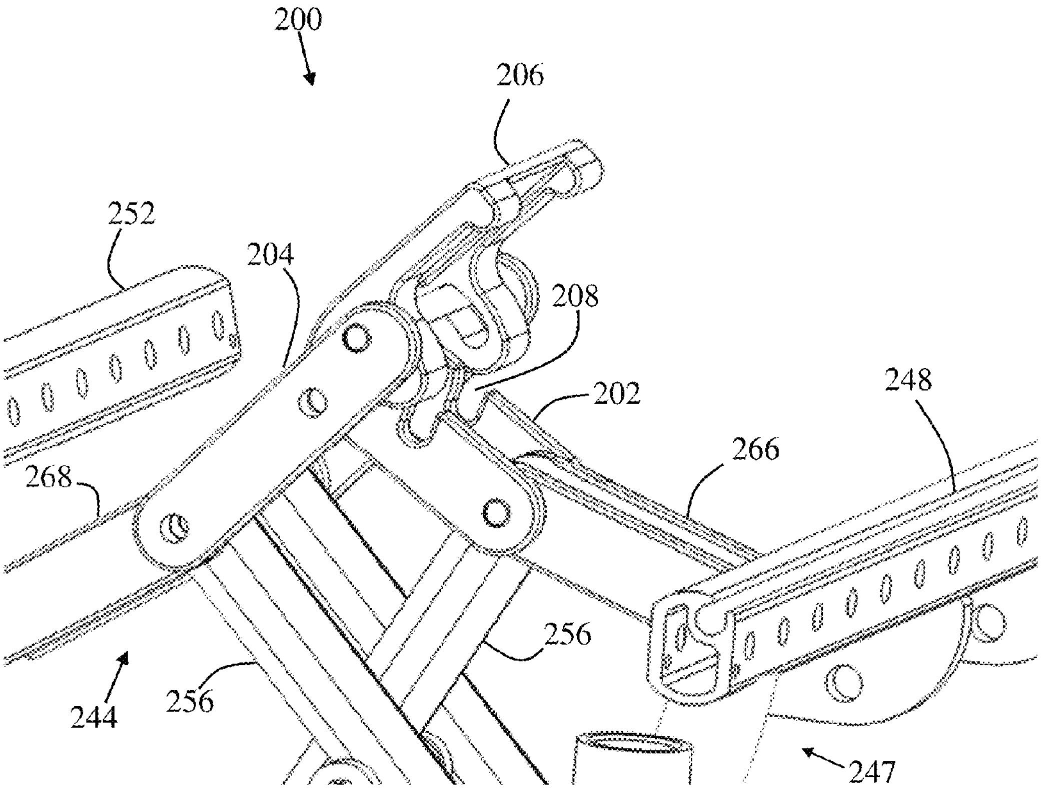
FIG. 8 is a schematic perspective view of a portion of another embodiment of a wheelchair frame.
Figure 9:
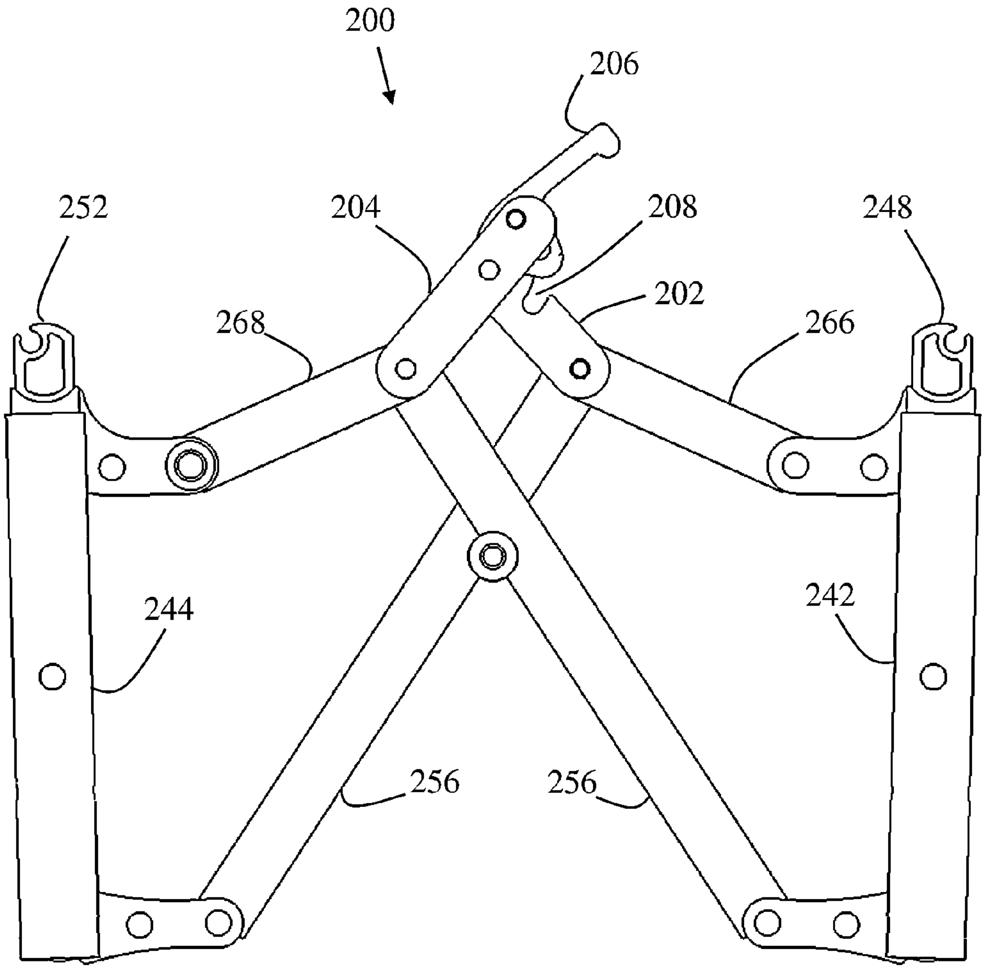
FIG. 9 is a side elevational view of the wheelchair frame of FIG. 8.

It is to be understood that different embodiments of the locking lever can used to lock the two hinge links together. As shown in FIGS. 8 and 9, a center mounted locking lever 200 can be employed. Hinge links 266, 268 connect cross braces 256 to the side frames 242, 244, respectively. The mounting lever 200 includes center connector links 202 and 204 that are connected to hinge links 266, 268, respectively, for the purpose of latching the hinge links 266, 268 together. The locking lever 200 connects the center connector links 202, 204, and hence the hinge links 266, 268, together in a manner that does not apply stress to the side frames 242, 244. The locking lever 200 includes a pivotable handle 206 for connecting the center connector links 202, 204 to each other in a latched relationship using the slot 208 in the connector link 202. The cross braces 256, however, are not in an overcenter toggle relationship.

Figure 10:
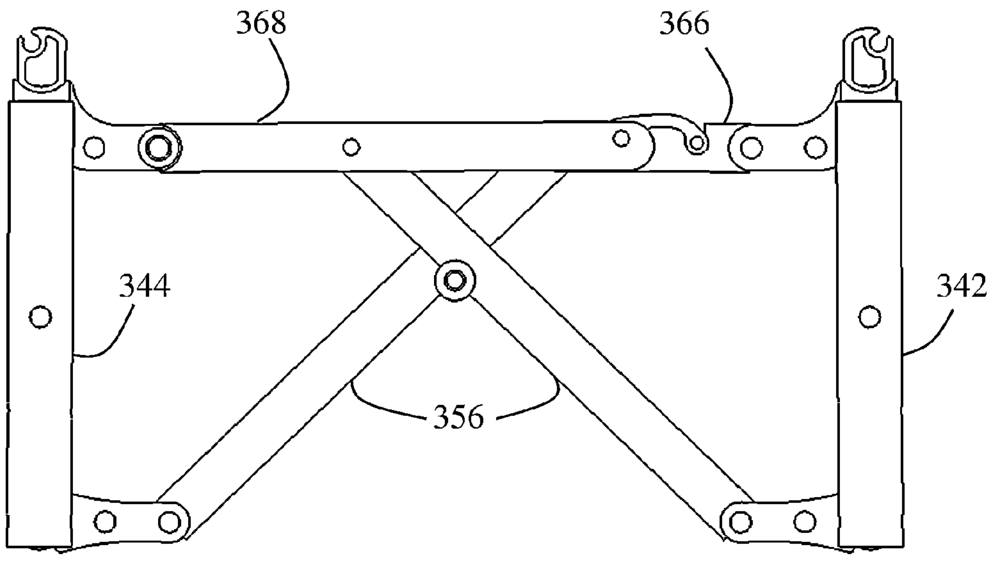
FIG. 10 is a schematic side elevational view of a portion of yet another embodiment of a wheelchair frame.
Figure 11:
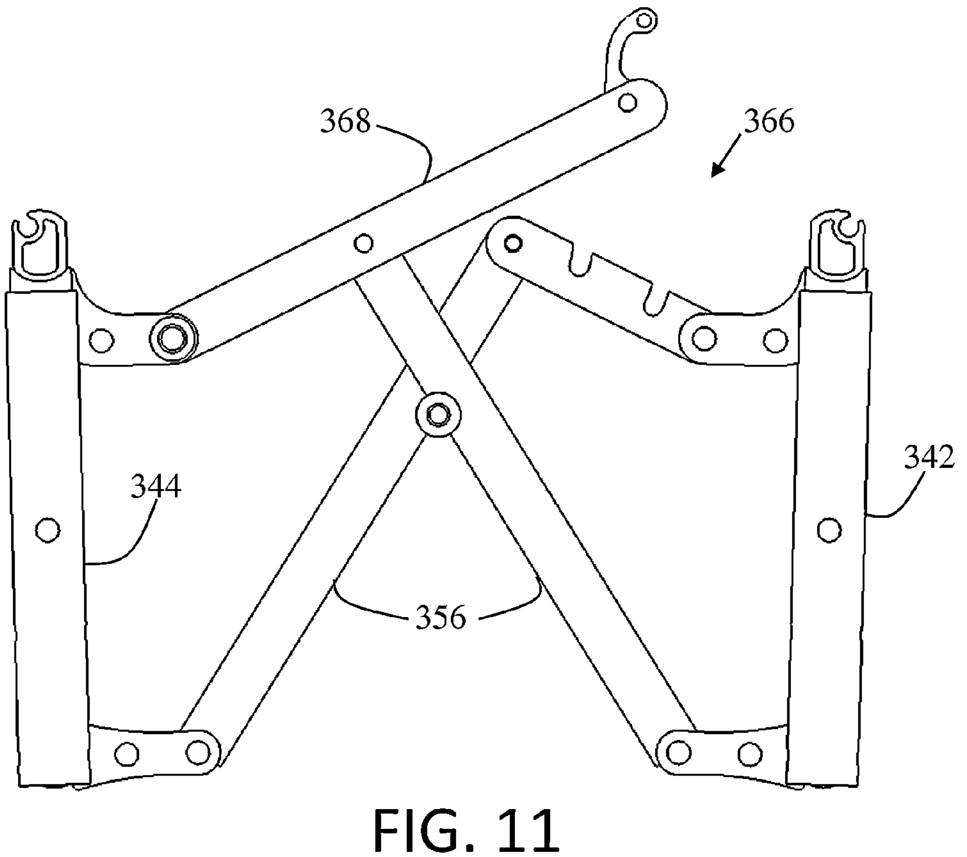
FIG. 11 is a view similar to that of FIG. 10, but with the wheelchair frame partially folded.
Figure 12:
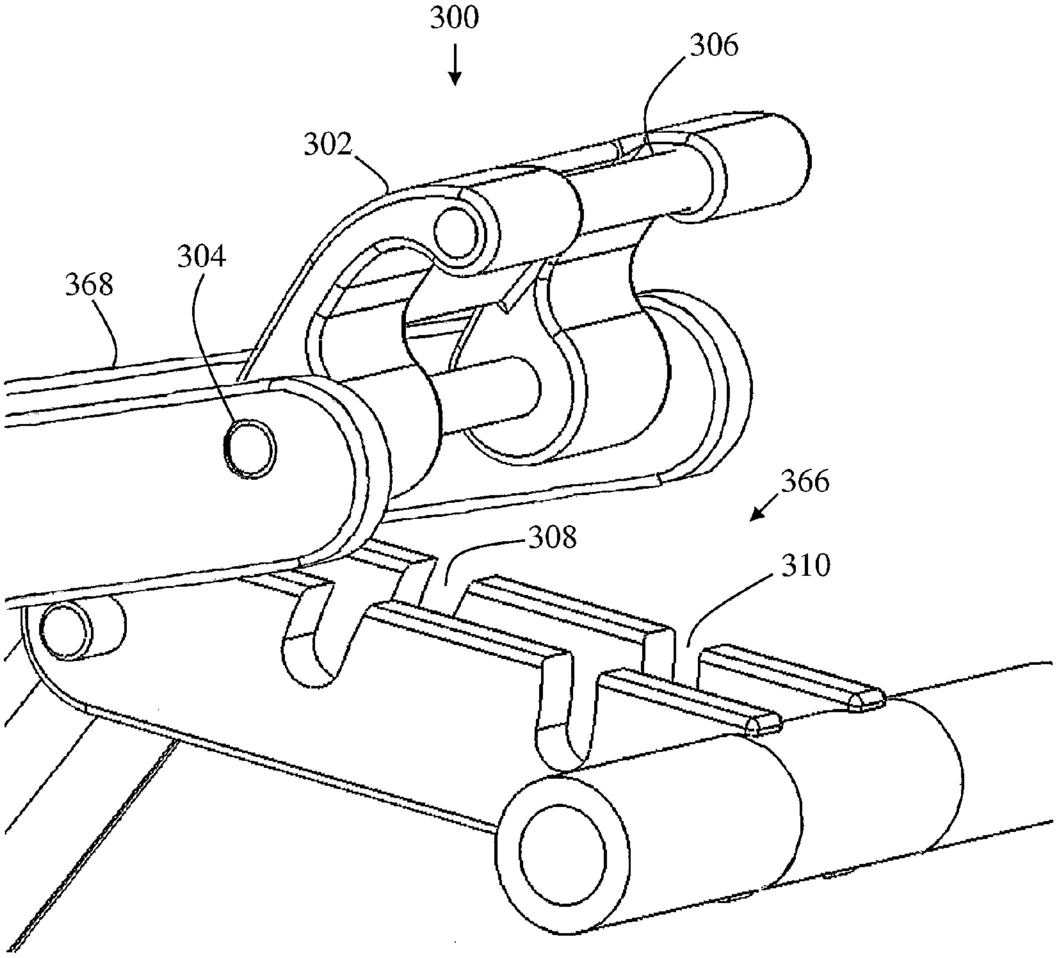
FIG. 12 is a schematic perspective view of the wheelchair frame of FIG. 10.

As shown in FIGS. 10-12, an off-center locking mechanism can be used to lock the two hinge links 366 and 368 together. The locking lever 300 includes a handle 302 pivotally mounted on pivot pin 304 to the hinge link 368. The locking lever also includes a forward pin 306. The pivot pin 304 and forward pin 306 mate with slots 308 and 310, respectively, in the hinge link 366 to connect hinge link 368 to hinge link 366.

Figure 13:
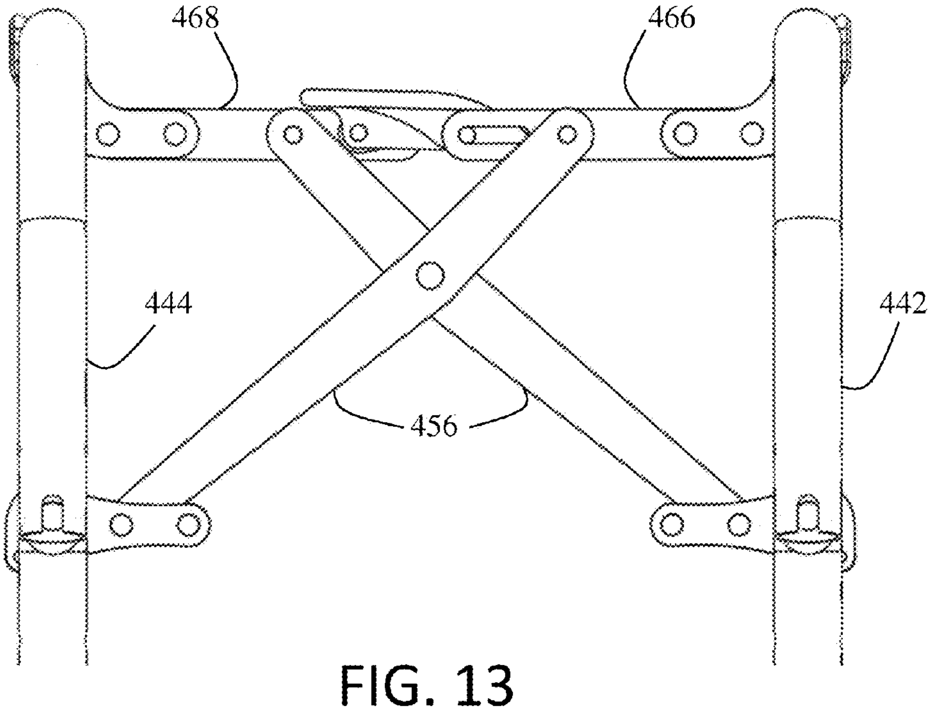
FIG. 13 is a schematic side elevational view of a portion of an additional embodiment of a wheelchair frame.
Figure 14:
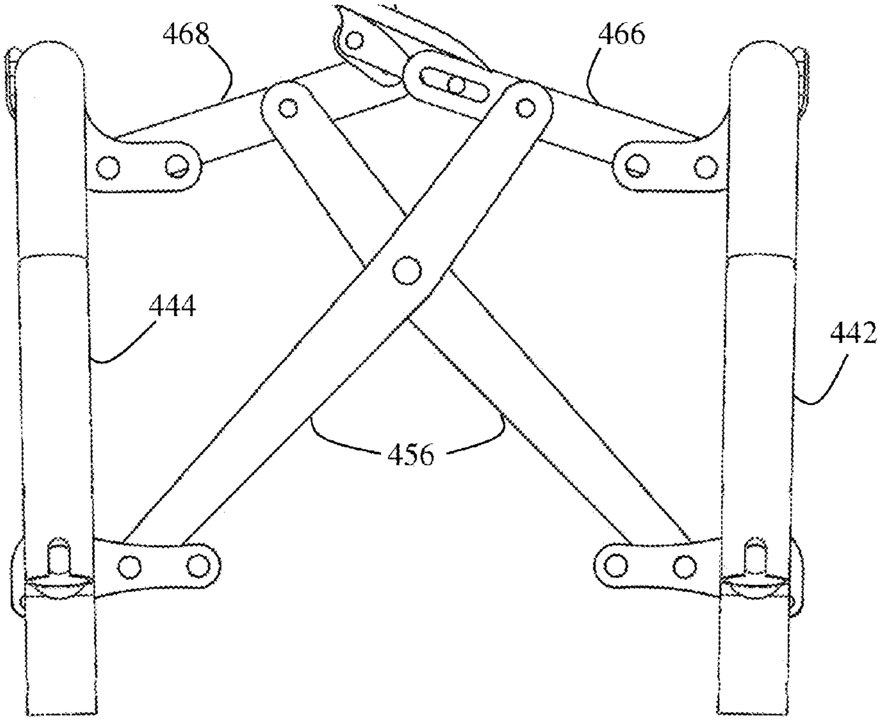
FIG. 14 is a view similar to that of FIG. 13, but with the wheelchair frame partially folded.
Figure 15:
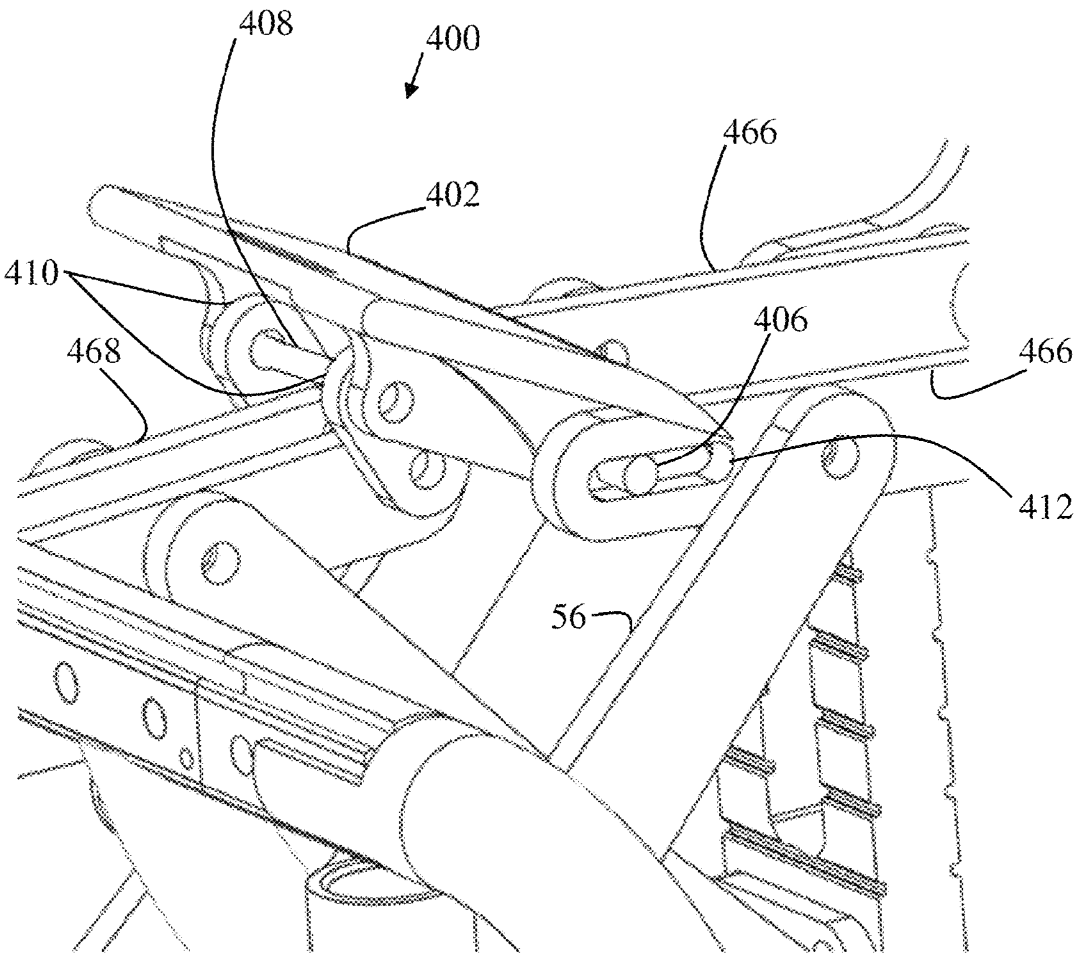
FIG. 15 is a schematic perspective view of the wheelchair frame of FIG. 13.

As shown in FIGS. 13-15, a slotted over center locking mechanism can be used to lock the two hinge links 466 and 468 together. The locking lever 400 includes a handle 402 pivotally mounted on pivot pin 406 to the hinge link 466. The locking lever 400 also includes a forward pin 408 connecting toggle links 410 to the locking lever 400. The toggle links 410 are pivotally mounted to the hinge link 468. A mounting slot 412 in the hinge link 466 provides a sliding pivotal connection for the pivot pin 406. When latched, the locking lever 400 connects the two hinge links 366, 368 in a substantially parallel, substantially rigid connection.

In one embodiment, the wheelchair has sufficient structural rigidity to support a rigid seat pan, and at the same time to also support a sling seat mounted to the upper side frame members without the use of a seat rail. The locking lever locks the hinge link pairs 66, 68, 266, 268, 366, 368 and 466, 468, respectively, together so that the wheelchair can accommodate both a sling seat and a rigid seat pan.

In one embodiment the locking mechanism is configured to lock the hinge links when they reach a condition of maximum extension.

In another embodiment the locking mechanism is configured to lock the hinge links when they reach a horizontal position.

Although the wheelchair has been disclosed as having the cross struts are rotatably connected to the lower side frame members, the hinge links are connected to the upper side frame members, one skilled in the art will appreciate that the cross struts can be rotatably connected to the upper side frame members, the hinge links can be connected to the lower side frame members, with the lock fixing the distance between the left and right lower side members at a widest point of rotation established by the hinge links.

The principle and mode of operation of this invention have been described in its preferred embodiments. However, it should be noted that this invention may be practiced otherwise than as specifically illustrated and described without departing from its scope.

What is claimed is:

1. A wheelchair comprising:

left and right side frames, each side frame having a lower side frame member and an upper side frame member; and a folding mechanism for connecting the left and right side frames to each other in a folding and unfolding relationship, the folding mechanism including:

cross struts rotatably connected to the side frame members, the cross struts including one or more cross struts from the left side frame pivotally connected to one or more cross struts from the right side frame;

hinge links connected to the side frame members, the hinge links having a first end pivotally connected to the side frame member and a distal end, wherein pivoting the hinge links relative to the side frame members causes the left and right side frames to move closer together in a folding movement or farther apart in an unfolding movement, and a lock for locking the hinge links together when the folding mechanism is unfolded to form a rigid truss between the left and right side frame members, thereby fixing the distance between the left and right side members at a widest point of rotation established by the hinge links.

2. The wheelchair of claim 1 in which the cross struts are rotatably connected to the lower side frame members, the hinge links are connected to the upper side frame members, with the hinge links first end being pivotally connected to the upper side frame member, and the lock fixes the distance between the left and right upper side members at a widest point of rotation established by the hinge links.

3. The wheelchair of claim 1 in which the cross struts are rotatably connected to the upper side frame members, the hinge links are connected to the lower side frame members, with the hinge links first end being pivotally connected to the lower side frame member, and the lock fixes the distance between the left and right lower side members at a widest point of rotation established by the hinge links.

4. The wheelchair of claim 2 including a stop preventing further rotation of the hinge links beyond the widest point of rotation.

5. The wheelchair of claim 1 including a pivotal connection between the hinge links and the cross struts so that rotation of the hinge links causes rotation of the cross struts.

6. The wheelchair of claim 1 in which the lock includes a locking lever, and further includes a tension link mounted to the locking lever and at least one of the hinge links so that force on the tension link pivots the hinge links relative to the upper side frame members, thereby rotating the cross struts and causing the left and right side frame members to move closer together to fold the wheelchair.

7. The wheelchair of claim 2 in which the lock has a pivotally mounted handle, the handle being mounted so that pivoting the handle to a locked position places the handle in a toggle over center condition.

8. The wheelchair of claim 1 in which the hinge links are connected to the upper side frame members in the absence of seat rails.

9. The wheelchair of claim 2 including a seat pan supported by the left and right upper side members.

10. The wheelchair of claim 2 including a seat sling supported by the left and right upper side members.

11. The wheelchair of claim 1 including a pivotally mounted handle, the handle being mounted so that lifting the handle in an upward direction both unlocks the left and right hinge links from each other, and pivots the hinge links relative to the side frames to fold the folding mechanism, with the handle enabling vertical folding of the wheelchair with one hand by grasping and lifting the handle.

12. The wheelchair of claim 2 in which with the truss between the left and right upper side frame members is sufficiently rigid to enable the wheelchair to accommodate interchangeably both a rigid seat pan and a sling seat.

13. A wheelchair comprising:

left and right side frames, each side frame having a lower side frame member and an upper side frame member; and a folding mechanism for connecting the left and right side frames to each other in a folding and unfolding relationship, the folding mechanism including:

cross struts rotatably connected to the lower side frame members, the cross struts including one or more cross struts from the left side frame pivotally connected to one or more cross struts from the right side frame;

hinge links connected to the upper side frame members, the hinge links having a first end pivotally connected to the upper side frame member and a distal end, with the hinge links being pivotally connected at their intermediate portions to the cross struts, wherein relative rotation of the cross struts with respect to each other causes pivoting of the hinge links relative to the upper side frame members, and causes the left and right side frames to move closer together in a folding movement or farther apart in an unfolding movement; and a lock for locking the hinge links together when the folding mechanism is unfolded to form a truss between the left and right upper side frame members, thereby fixing the distance between the left and right upper side members, the lock having a pivotally mounted handle, the handle being mounted so that pivoting the handle to a locked position places the handle in a toggle over center condition.

14. The wheelchair of claim 13 in which the handle is mounted so that lifting the handle in an upward direction both unlocks the left and right hinge links from each other, and pivots the hinge links relative to the side frames to fold the folding mechanism, with the folding capable of being accomplished with one hand by grasping and lifting the handle.

15. The wheelchair of claim 13 in which with the truss between the left and right upper side frame members is sufficiently rigid to enable the wheelchair to accommodate interchangeably both a rigid seat pan and a sling seat.

16. The wheelchair of claim 13 in which the cross braces are not in an overcenter toggle relationship when the folding mechanism is unfolded.

17. A wheelchair comprising:

left and right side frames, each side frame having a lower side frame member and an upper side frame member; and a folding mechanism for connecting the left and right side frames to each other in a folding and unfolding relationship, the folding mechanism including:

cross struts rotatably connected to the lower side frame members, the cross struts including one or more cross struts from the left side frame pivotally connected to one or more cross struts from the right side frame;

hinge links connected to the upper side frame members, the hinge links having a first end pivotally connected to the upper side frame member and a distal end, with the hinge links being pivotally connected at their intermediate portions to a cross strut, wherein relative rotation of the cross struts with respect to each other causes pivoting of the hinge links relative to the upper side frame members, and causes the left and right side frames to move closer together in a folding movement or farther apart in an unfolding movement; and a lock for locking the hinge links together when the folding mechanism is unfolded to form a rigid truss between the left and right upper side frame members, thereby fixing the distance between the left and right upper side members, the lock having a pivotally mounted handle, the handle being mounted so that lifting the handle in an upward direction both unlocks the left and right hinge links from each other, and pivots the hinge links relative to the side frames to fold the folding mechanism, with the folding capable of being accomplished with one hand by grasping and lifting the handle.

18. The wheelchair of claim 17 in which the pivotally mounted handle is mounted so that pivoting the handle to a locked position places the handle in a toggle over center condition.

19. The wheelchair of claim 17 in which the lock is a locking lever, and further includes a tension link mounted to at least one of the hinge links so that force on the tension link pivots the hinge links relative to the upper side frame members, thereby rotating the cross struts and causing the left and right side frame members to move closer together to fold the wheelchair.

20. The wheelchair of claim 17 in which with the truss between the left and right upper side frame members is sufficiently rigid to enable the wheelchair to accommodate interchangeably both a rigid seat pan and a sling seat.

* * * * *